US012723682B2

(12) United States Patent
Lach et al.

(10) Patent No.: US 12,723,682 B2
(45) Date of Patent: Sep. 1, 2026

(54) PIPE FOR TRANSPORTING A FLUID, INSULATED PIPE WITH SUCH, AND METHOD FOR MANUFACTURING A PIPE

(71) Applicants: BRUGG ROHRSYSTEM AG, Kleindöttingen (CH); GOLAN RENEWABLE INDUSTRIES LTD., Kibbutz Sha'ar Hagolan (IL)

(72) Inventors: Jaroslaw Lach, Dottingen (CH); Ziv Shindler, Givat Ada (IL); Eyal Gruner, Kibbutz Sha'ar Hagolan (IL)

(73) Assignees: BRUGG ROHRSYSTEM AG, Kleindöttingen (CH); GOLAN RENEWABLE INDUSTRIES LTD., Kibbutz Sha'ar Hagolan (IL)

(*) Notice: Subject to any disclaimer, the term of this patent is extended or adjusted under 35 U.S.C. 154(b) by 294 days.

(21) Appl. No.: 18/681,402

(22) PCT Filed: Aug. 9, 2021

(86) PCT No.: PCT/EP2021/072166
§ 371 (c)(1),
(2) Date: Feb. 5, 2024

(87) PCT Pub. No.: WO2023/016624
PCT Pub. Date: Feb. 16, 2023

(65) Prior Publication Data

US 2024/0369162 A1 Nov. 7, 2024

(51) Int. Cl.
*F16L 9/12* (2006.01)
*B32B 1/08* (2006.01)
(Continued)

(52) U.S. Cl.
CPC .................. *F16L 9/12* (2013.01); *B32B 1/08* (2013.01); *B32B 5/028* (2013.01); *B32B 5/18* (2013.01);
(Continued)

(58) Field of Classification Search
CPC ... F16L 9/12; B32B 1/08; B32B 5/028; B32B 5/18; B32B 7/12; B32B 15/043;
(Continued)

(56) References Cited

U.S. PATENT DOCUMENTS 6,179,008 B1 * 1/2001 Kawazura ............. B29C 70/088 138/125
6,422,269 B1 * 7/2002 Johansson ............... F16L 33/01 138/140
(Continued)

FOREIGN PATENT DOCUMENTS

CH 680815 A5 11/1992
EP 2574833 A1 4/2013
(Continued)

OTHER PUBLICATIONS

Miron Gorilovskiy et al., "The Issue of Strength Calculation for Reinforced Polymer Pipes"; Plastic Pipes No. 2; Information and Analytical Journal; Jul. 2005,, 9pp.
(Continued)

*Primary Examiner* — David R Deal
(74) *Attorney, Agent, or Firm* — The Roy Gross Law Firm, LLC; Roy D. Gross

(57) ABSTRACT

The invention relates to a pipe (P) for transporting a fluid (8), comprising an innermost polymeric tube (1) for transporting the fluid (8), a fluid diffusion barrier layer (3) surrounding the polymeric tube (1), wherein the fluid diffusion barrier layer (3) is bonded with the polymeric tube (1) by means of a first adhesive layer (2), a reinforcing layer (5) surrounding the fluid diffusion barrier layer (3). The reinforcing layer (5) comprises meshed fibers (N) and is bonded with the fluid diffusion barrier layer (3) by means of a second adhesive layer (4). The pipe further comprises an outermost polymeric shell (7) surrounding the reinforcing layer (5), which
(Continued)

is bonded with the reinforcing layer (5) by means of a third adhesive layer (6).

15 Claims, 3 Drawing Sheets

(51) Int. Cl.

| | |
|---|---|
| ***B32B 5/02*** | (2006.01) |
| ***B32B 5/18*** | (2006.01) |
| ***B32B 7/12*** | (2006.01) |
| ***B32B 15/04*** | (2006.01) |
| ***B32B 15/085*** | (2006.01) |
| ***B32B 15/09*** | (2006.01) |
| ***B32B 15/20*** | (2006.01) |
| ***B32B 27/06*** | (2006.01) |
| ***B32B 27/08*** | (2006.01) |
| ***B32B 27/12*** | (2006.01) |
| ***B32B 27/20*** | (2006.01) |
| ***B32B 27/28*** | (2006.01) |
| ***B32B 27/30*** | (2006.01) |
| ***B32B 27/32*** | (2006.01) |
| ***B32B 27/36*** | (2006.01) |

(52) U.S. Cl.

CPC .............. *B32B 7/12* (2013.01); *B32B 15/043* (2013.01); *B32B 15/085* (2013.01); *B32B 15/09* (2013.01); *B32B 15/20* (2013.01); *B32B 27/065* (2013.01); *B32B 27/08* (2013.01); *B32B 27/12* (2013.01); *B32B 27/20* (2013.01); *B32B 27/288* (2013.01); *B32B 27/306* (2013.01); *B32B 27/32* (2013.01); *B32B 27/36* (2013.01); *B32B 2260/021* (2013.01); *B32B 2260/046* (2013.01); *B32B 2262/101* (2013.01); *B32B 2262/106* (2013.01); *B32B 2266/0278* (2013.01); *B32B 2307/304* (2013.01); *B32B 2307/7246* (2013.01); *B32B 2307/7376* (2023.05); *B32B 2597/00* (2013.01)

(58) Field of Classification Search

CPC ....... B32B 15/085; B32B 15/09; B32B 15/20; B32B 27/065; B32B 27/08; B32B 27/12; B32B 27/20; B32B 27/288; B32B 27/306; B32B 27/32; B32B 27/36; B32B 2307/7376; B32B 2307/304; B32B 2307/7246; B32B 2260/046; B32B 2262/101; B32B 2262/106; B32B 2666/0278

USPC .......................................................... 138/153

See application file for complete search history.

(56) References Cited

U.S. PATENT DOCUMENTS

| | | | | |
|---|---|---|---|---|
| 2004/0028860 | A1* | 2/2004 | Dalal | F16L 9/133 138/137 |
| 2015/0375433 | A1* | 12/2015 | Brønnum | F16L 59/143 264/46.1 |
| 2017/0058510 | A1* | 3/2017 | Seabaugh | B32B 27/36 |
| 2018/0202583 | A1* | 7/2018 | Rimal | B32B 7/12 |
| 2020/0400251 | A1 | 12/2020 | Campbell et al. | |
| 2023/0158785 | A1* | 5/2023 | Hata | B32B 1/08 428/36.6 |

FOREIGN PATENT DOCUMENTS

| | | | |
|---|---|---|---|
| EP | 2079573 | B1 | 11/2013 |
| RU | 145541 | U1 | 9/2014 |
| RU | 146428 | U1 | 10/2014 |
| WO | 2009013567 | A2 | 1/2009 |
| WO | 2012047136 | A1 | 4/2012 |

OTHER PUBLICATIONS

Aleksandr Shmelev, “Use of Polymer Pipes Flexible Pipe Series for Heating”; Swiss technology on Moscow soil, Plastic Pipes No. 5, Dec. 2004, 13pp.

Aleksandr Shmelev, “Flexible insulated polymer pipes have been available on the Russian market for 5 years”; Plastic Pipes No. 3, Information and Analytical Journal, Technologies and materials, Oct. 2005, 12pp.

PCT International Search Report for International Application No. PCT/EP2021/072166, mailed May 4, 2022, 3pp.

PCT Written Opinion for International Application No. PCT/EP2021/072166, mailed May 4, 2022, 8pp.

* cited by examiner

PIPE FOR TRANSPORTING A FLUID, INSULATED PIPE WITH SUCH, AND METHOD FOR MANUFACTURING A PIPE

CROSS-REFERENCE TO RELATED APPLICATIONS

This application is a National Phase of PCT Patent Application No. PCT/EP2021/072166 having an International filing date of Aug. 9, 2021. The contents of this application are incorporated by reference in its entirety.

TECHNICAL FIELD

The invention relates to a pipe for transporting fluid, to an insulated pipe, particularly for district heating, comprising such a pipe for transporting fluid and to a method for manufacturing a pipe for transporting fluid according to the respective independent claim.

BACKGROUND ART

Pipes for transporting a fluid are widely known in various fields, for example in the field of district heating. Such pipes in many cases are multilayer pipes, which must fulfill a number of requirements depending on the purpose of the pipe and on the fluid to be transported. Particularly, such requirements include resistance to the high pressures acting on the pipe walls and the pipes must withstand high temperatures of the medium transported within, for example typically occurring in the field of district heating.

Today, such pipes are often flexible polymeric pipes, widely made of cross-linked polyethylene (PEX), allowing a comparatively easy manufacture in long segments and, due to their flexibility, an easy installation by drawing them from a coil or drum. Particularly in the field of district heating, an easy installation is a central requirement due to the very long distances for laying such pipes. Even though PEX satisfies this aspect, it has the limitation that it is not sufficiently resistant to high temperatures of ca. 95°-110° C. causing the pipe walls to soften and consequently to lose their resistance to the required pressures (target pressures).

Additionally, in many instances, these pipes are included in insulated pipes as so-called medium pipes, which are surrounded by an insulating material, typically a hardened foam, which itself is surrounded by a rugged outer shell protecting the pipe from the environment. This introduces the problem that the PEX material of the medium pipe is susceptible to diffusion of different elements and compounds, e.g. oxygen, into the medium pipe. This is undesirable as it may e.g. lead to increased corrosion of metal parts present in the water circuit. Oxygen is also known to cause oxidative degradation of PEX pipes thus leading to pipe failures over time. Furthermore, the PEX material of the medium pipe is susceptible to diffusion of water vapor out the medium pipe, which may have a detrimental effect on the insulation properties of the insulating material, which is typically a polyurethane (PUR) foam.

Initial workaround solutions to increase the medium pipe strength by simply designing it to have a thicker wall doesn't solve the latter problem and incurs a substantial higher material consumption. Consequently, there has been a trend to design the medium pipes with layered walls, of which the different layers account for solving different problems. For example, in order to minimize the diffusion problem, a layer made of ethylene-vinyl-alcohol-copolymer (EVOH) has been introduced, which acts inter alia as a good oxygen barrier.

In order to solve the firstly mentioned pressure problem, EP 2574 833 proposes using a layered pipe that comprises a reinforcing layer consisting of meshed fibers chosen from a strong material such as aramid. While this layered pipe provides a good resistance to a certain pressure and at the same time acts as a good fluid diffusion barrier due to the use of a barrier layer, it has certain disadvantages as well. One disadvantage originates from the fact that the force such a reinforcement material has to withstand acts both in longitudinal (axial) direction of the pipe and in radial direction. It is desired that the fibers provide reinforcement in both directions in an equally reliable manner. WO 2009/013567 discloses a way of calculating the pattern of the meshed fibers forming the reinforcing layer so as to provide reinforcement in both directions for a given target pressure. The meshed fibers are arranged at a certain given angle with respect to the longitudinal axis of the medium pipe, subsequently called equilibrium angle, at which given angle an equilibrium between the resistance of the fibers against radial and axial force components due to the pressure is equal. The given angle determines the pressure. However, medium pipes may be manufactured in different sizes (e.g. between 40 mm and 160 mm) and the target pressure the pipe has to withstand may vary (typically between 15 and 20 bar). While said solution works for certain fixed parameters, it has the flaw that varying one or more parameters results in an imbalanced resistance against radial and axial forces on the fiber due to the pressure, i.e. the radial reinforcement may be increased at the cost of a lower resistance to axial force components on the fiber due to the pressure. This means lowering of the resulting burst pressure of the pipe, which is determined by the lower component of the radial and axial force components.

Yet another requirement for such a medium pipe is that the pipe is resistant to temperature changes and mechanical load, which typically arises in the field of use due to environmental influences. In order to account for this requirement, EP 2 574 833 proposes to embed the reinforcing layer between the barrier layer and an outer protective layer by using an adhesive layer which on the one hand binds the protective layer to the barrier layer and on the other hand doesn't bind the fibers of the reinforcing layer, which allows the fibers to move to a certain extent with respect to the rest of the pipe body in the presence of such temperature or mechanical load changes.

DISCLOSURE OF THE INVENTION

Hence, it is a general objective of the present invention to provide a pipe for transporting a fluid, which at least minimizes the aforementioned problems. Particularly, the invention has the objective to provide a pipe with higher performance, better durability and which is more reliable in view of changing operation parameters and environmental influences.

In order to implement these and still further objects of the invention, which will become more readily apparent as the description proceeds, in a first aspect of the invention the pipe is manifested by the features that it comprises an innermost polymeric tube for transporting the fluid, a fluid diffusion barrier layer surrounding the polymeric tube, a reinforcing layer surrounding the fluid diffusion barrier layer and an outermost polymeric shell surrounding the reinforcing layer. The fluid diffusion barrier layer is bonded with the polymeric tube by means of a first adhesive layer. The reinforcing layer comprises meshed fibers providing axial and radial reinforcement for the pipe and is bonded with the fluid diffusion barrier layer by means of a second adhesive layer. The polymeric shell is bonded with the reinforcing layer by means of a third adhesive layer. The third adhesive layer and/or the second adhesive layer are/is adapted to adhere to the meshed fibers of the reinforcing layer.

While designing the meshed fibers to be able to move between the protective layer and the barrier layer may account for certain size changes of the pipe, e.g. due to dilatation, such movement may cause friction with the neighboring layers and consequently damage the barrier layer and/or the second or the third adhesive layer, thereby weakening the pipe as a whole, particularly as the meshed fibers are made of high-strength materials such as aramid, which knowingly is very resistant to abrasion. Another disadvantage of designing the meshed fibers to be able to move between the protective layer and the barrier layer is that the meshed fibers can only absorb pressures originating from the medium pipe to a limited extent, if at all, because they don't form a rigid composite with the adjacent layers. Consequently, the present invention adopts another approach consisting in fixing the meshed fibers and not allowing them to move. As such fibers are extremely resilient, they do withstand said environmental changes while eliminating the danger of damage of neighboring layers due to abrasion. Consequently, the measure of choosing a third adhesive layer which also bonds the fibers, results in the creation of a very stable entity, which enhances durability of the pipe as a whole.

In a second aspect of the invention, the pipe for transporting a fluid comprises at least an innermost polymeric tube for transporting the fluid, a fluid diffusion barrier layer surrounding the polymeric tube, a reinforcing layer surrounding the fluid diffusion barrier layer and an outermost polymeric shell pipe surrounding the reinforcing layer. The fluid diffusion barrier layer is bonded with the polymeric tube by means of a first adhesive layer. The reinforcing layer comprises meshed fibers providing axial and radial reinforcement for the pipe and is bonded with the fluid diffusion barrier layer by means of a second adhesive layer. The polymeric shell is bonded with the reinforcing layer by means of a third adhesive layer.

The meshed fibers in each direction forming the mesh are arranged at an angle α relative to the longitudinal axis of the pipe non-parallel to a cross-section of the pipe and non-parallel to a longitudinal axis of the pipe. The angle α is determined according to formula (I):

$$P = \frac{2N\sin^2\alpha}{\pi D^2\cos\alpha}\frac{R}{\left(1+\frac{\epsilon}{100}\right)^2} \quad \text{(I)}$$

where N represents the total number of the meshed fibers, P represents a target burst pressure, R represents the maximum load per meshed fiber in Newton, D represents the outer diameter of the innermost polymeric tube, and $\epsilon$ represents a meshed fiber elongation at break.

The reinforcing layer comprises a number $N_a$ of additional longitudinal fibers which are oriented parallel to the longitudinal axis of the pipe. The number $N_a$ of longitudinal fibers is calculated by the formula (II):

$$N_a \geq (0.5\,N\sin\propto\tan\alpha - N\cos\alpha)\frac{\frac{R}{\left(1+\frac{\epsilon}{100}\right)^2}}{\frac{R_a}{\left(1+\frac{\epsilon_a}{100}\right)^2}} \quad \text{(II)}$$

where $\epsilon_\alpha$ represents a longitudinal fiber elongation at break and Ra represents the maximum load per longitudinal fiber in Newton.

By using additional longitudinal fibers, the pipe can be designed in a more flexible way with respect to the desired target pressure, while at the same time maintaining an equilibrium between the axial and radial force components. In other words, the same degree of reinforcement is attained in both radial and axial directions even if the target pressure is specified differently for different pipes. In this way, the overall pipe strength is increased.

A third aspect of the invention relates to an insulated pipe for transporting a fluid, particularly heated water for district heating. The insulated pipe comprises a pipe according to the first or the second aspect of the invention, used as a medium pipe for transporting the fluid, particularly hot water, a thermal insulation layer surrounding the outermost polymeric shell of said pipe and an outer jacket surrounding the thermal insulation layer.

The insulated pipe inherits the benefits of the pipe according to the first or the second aspect of the invention.

A fourth aspect of the invention relates to a method for manufacturing a pipe according to the first or the second aspect of the invention. The method comprises the following steps:

a) extruding the innermost polymeric tube,
b) applying the first adhesive layer onto the innermost polymeric tube,
c) applying the fluid diffusion barrier layer onto the first adhesive layer,
d) applying the second adhesive layer onto the fluid diffusion barrier layer,
e) applying the reinforcing layer onto the second adhesive layer,
f) applying the third adhesive layer onto the reinforcing layer, and
g) extruding the outermost polymeric shell pipe onto the third adhesive layer.

BRIEF DESCRIPTION OF THE DRAWINGS

The invention will be better understood and objects other than those set forth above will become apparent when consideration is given to the following detailed description thereof in combination with the annexed drawings, wherein:

FIG. 2 shows a detail of FIG. 1 illustrating the reinforcing layer.

MODES FOR CARRYING OUT THE INVENTION

In the following, the term "pipe" or "medium pipe" are equivalent and relate to the first and second aspect of the invention, while the term "insulated pipe" relates to the third aspect of the invention.

Throughout the description, the various embodiments of the pipe are assumed to apply to both the first and the second aspect of the invention unless otherwise stated.

Throughout the description, the term "layer" is used as a superordinate term for layers of the pipe or of the insulated pipe. Contrary to this, the term "sublayer" refers to a laminate or sandwiched structure of one layer.

The term "fluid" as used herein encompasses liquid and gaseous compounds, whereas the term "liquid" only refers to liquid compounds. For the purpose of the description, water is used exemplarily but the invention shall be understood to encompass various other fluids, e.g. mineral oil.

In the present context, the term "meshed fibers" refers only to circumferentially extending fibers, while the term "longitudinal fibers" refers to fibers that are parallel to the longitudinal axis of the pipe, even though in embodiments the longitudinal fibers may also be meshed into said meshed fibers.

In the present context, the term "pressure" refers to pressure in general as a variable. The term "target pressure" refers to the maximum pressure that fibers or the pipe, respectively, shall withstand during normal operation during the entire life span of the pipe. The term "burst pressure" refers to a maximum pressure that fibers or the pipe, respectively, shall withstand that is higher than the target pressure for a specified period of time. The term "target burst pressure" refers to a desired burst pressure that the fibers or the pipe, respectively, shall be able to withstand within the specified period of time. The target burst pressure is defined as the target pressure multiplied by relevant safety and design coefficients.

Figure 1:
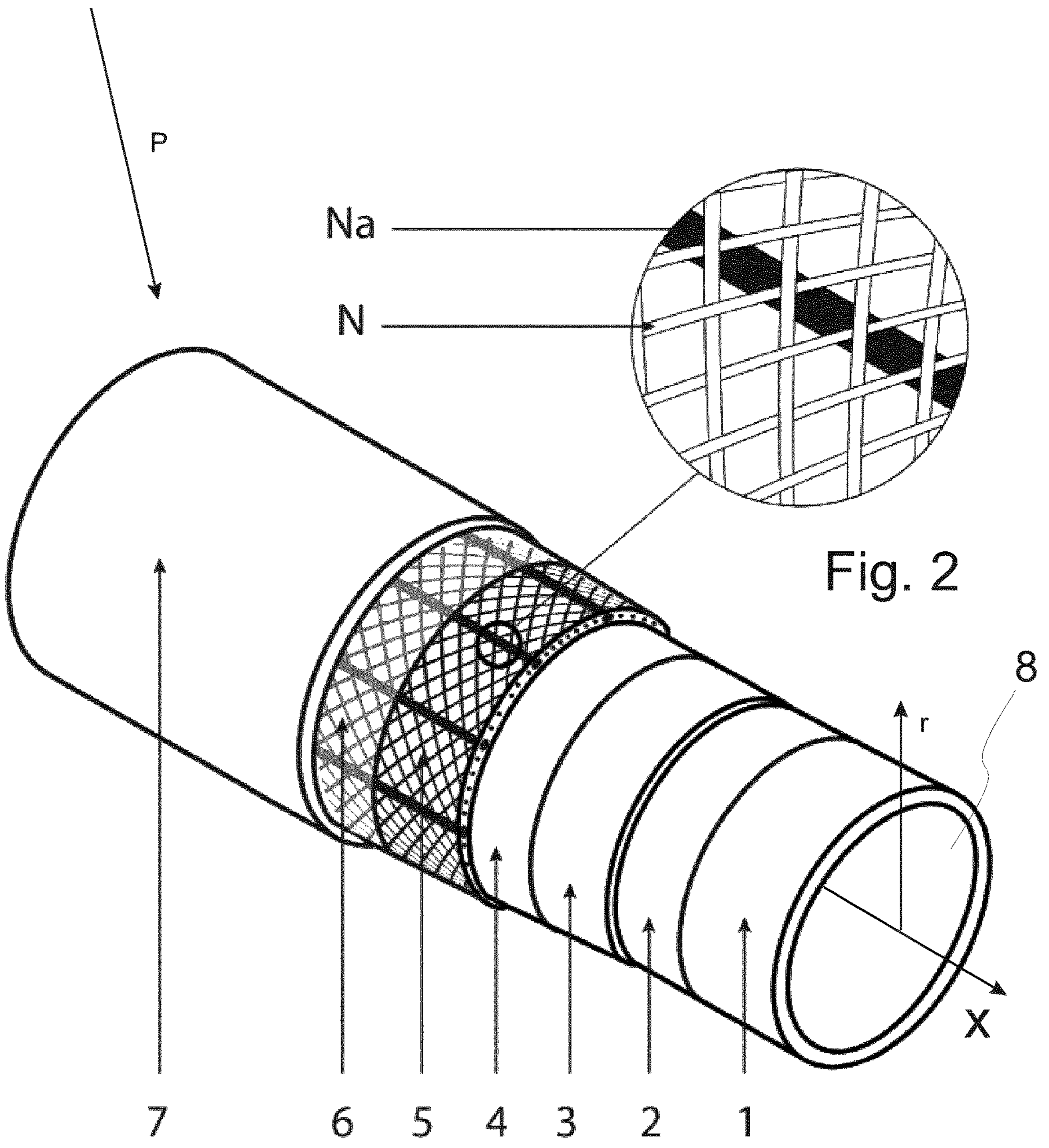
FIG. 1 shows a perspective section view of a pipe according to the first or the second aspect of the invention.

With reference to FIG. 1, the pipe comprises as mentioned an innermost polymeric tube 1 for transporting the fluid, a fluid diffusion barrier layer 3 surrounding the polymeric tube, a reinforcing layer 5 surrounding the fluid diffusion barrier layer and an outermost polymeric shell 7 surrounding the reinforcing layer.

Now, the polymeric tube 1 and layers 3, 5 and 7 will be described first, followed by a description of the way the layers are bonded. Subsequently, the reinforcing layer 5 will be described in more detail.

The polymeric tube 1 is preferably a PEX-tube or a PE-RT-tube, where PE-RT stands for Polyethylene of Raised Temperature resistance. PEX is widely known to the skilled person and will not be described in detail. PE-RT is known and e.g. described at https://plasticpipe.org/building-construction/bcd-pe-rt.html. The polymeric tube 1 may however also be made of and not only polybutylene (PB) or polyketone.

In one embodiment, the fluid diffusion barrier layer 3 is made of a thermoplastic material adapted to limit a diffusion of at least one of the fluids: oxygen, pentane, CO2, HFO from the outside into the innermost polymeric tube and to limit a diffusion of at least water vapor from the inside of the innermost polymeric tube to the outside of the fluid diffusion barrier layer. In this embodiment, the preferred thermoplastic material is EVOH or an aliphatic polyketone.

In another embodiment, the fluid diffusion barrier layer comprises a metal adapted to stop a diffusion of at least one of the fluids: oxygen, pentane, CO2, HFO from the outside into the innermost polymeric tube and to stop a diffusion of at least water vapor from the inside of the innermost polymeric tube to the outside of the fluid diffusion barrier layer. The preferred metal is aluminium.

While using a thermoplastic material is advantageous in terms of material and manufacturing costs, it has the disadvantage that such material may degrade at high temperatures of the water transported through the polymeric tube. Aluminium on the other hand has the advantage that it is resistant to high temperatures and it blocks diffusion, such that said fluids do not pass the barrier at all. Furthermore, aluminium does not degrade in time, as contrary to thermoplastic materials. Finally, manufacturing aluminium is straightforward. In contrast to this, known thermoplastic materials which can be used as fluid diffusion barrier are more difficult to manufacture and process parameters have to be adjusted carefully. Before usage, such materials have to be dried thoroughly and they require special storage conditions in order to prevent degradation. For these reasons, using aluminium as the fluid diffusion barrier layer 3 is the preferred option for the present invention.

When using aluminium as the main material for the fluid diffusion layer, the layer may have different configurations. In a first configuration, one aluminium alloy layer or more aluminium sublayers may be used. An aluminium alloy layer or multiple aluminium alloy sublayers are used if a thickness of each layer is greater than 0.1 mm. This is due to the fact that thinner Al-layers are difficult to apply due to the danger that they may tear during the application process. Layers with a thickness greater than 0.1 mm have proven to be stable enough for a reliable application onto the polymeric tube 1.

In a second configuration, which encompasses multiple options, the fluid diffusion layer 3 may itself be composed of multiple sublayers, which may also include polymeric sublayers aside of aluminium alloy layers. The advantage is that in such laminate fluid diffusion layers the thickness of each Al-sublayer may be lower due to the additional stability provided by the polymeric sublayers. Thus, aluminium, for the manufacture of which, as known, a high energy consumption is required, can be saved. Amongst the preferred options, the following laminate layer options will be named, as seen radially outward from the longitudinal axis of the pipe. It is noted that the choice of the laminate fluid diffusion barrier layer is not limited to these options. It is noted that any suitable technology other than lamination for producing a multi-layer fluid diffusion barrier layer may be used. Said options of the multi-layer (sublayer) configuration include:

1) an aluminium sublayer and a polymeric sublayer;
2) a first aluminium sublayer, a polymeric sublayer, a second aluminium sublayer, an adhesive sublayer;
3) an aluminium sublayer, a polymeric sublayer, an adhesive sublayer;
4) an adhesive sublayer, an aluminium sublayer, a polymeric sublayer;
5) a first adhesive sublayer, an aluminium sublayer, a polymeric sublayer, a second adhesive sublayer, particularly wherein the first adhesive sublayer and the second adhesive sublayer consist of the same material;
6) a first adhesive sublayer, an aluminium sublayer, a polymeric sublayer, a second aluminium sublayer, a second adhesive sublayer;
7) at least two aluminium sublayers;

While foils with sublayers according to the above options containing polymeric layers can be obtained as already prefabricated foils, in other embodiments, such foils for the fluid diffusion layer may also be manufactured as needed. They can e.g. be manufactured by extrusion coating. This process is e.g. described at https://en.wikipedia.org/wiki/Extrusion_coating. Another way to manufacture such foils is by laminating the sublayers. This process is e.g. described at https://en.wikipedia.org/wiki/Lamination.

It is preferred that in all options containing a polymeric sublayer the polymeric sublayer is a PET sublayer or a PE sublayer.

In case the fluid diffusion barrier layer comprises multiple sublayers, a thickness of each aluminium sublayer is preferably between 0.005 mm and 0.2 mm, most preferred 0.025 mm. Exemplarily, in option 3) the aluminium sublayer has a thickness of 0.025 mm, the polymeric sublayer (e.g. PEX) has a thickness of 0.012 mm and the adhesive sublayer has a thickness of 0.025 mm.

One advantage of using a laminate layer is that the fluid diffusion layer can be made even more stable as compared to the configuration using only one Al-layer. If compared to the configuration using multiple Al-sublayers, the laminate diffusion barrier layer configuration is advantageous as such laminate layer can be prefabricated and applied in one step, while multiple Al-sublayers have to be applied in one step per sublayer, therefore rendering the manufacturing process more complex.

In yet another embodiment, it is possible to apply multiple laminate diffusion barrier layers, of which all laminate layers can have the same structure with respect to one of the aforementioned options, or of which each laminate layer can be different within the scope of the above options.

In the first aspect of the invention, the reinforcing layer comprises circumferentially applied meshed fibers N that form a fiber pattern. In the second aspect of the invention, the reinforcing layer comprises above mentioned meshed fibers N and additional longitudinal fibers Na. The meshed fibers N are preferably selected from the group comprising nylon, carbon, ultra-high molecular weight polyethylene (UHMWP), GF, aramid, para-aramid, meta-aramid, glass fibers or any combination thereof. However, other fibers exhibiting a particular required strength for a certain operation scenario may also be used.

The polymeric shell 7 preferably comprises a polyolefin. In certain cases, for example if the pipe is used for itself without other outer layers, e.g. without being integrated in an insulated pipe according to the third aspect of the invention, it may be preferred that the polymeric shell additionally comprises fibers, particularly glass fibers or carbon fibers or a combination thereof. Such fibers increase stability of the polymeric shell if the polymeric shell is directly exposed to the environment.

The polymeric tube 1 is bonded (glued) to the fluid diffusion barrier layer 3 by means of a first adhesive layer 2. The fluid diffusion barrier layer 3 is bonded (glued) to the reinforcing layer 5 by means of a second adhesive layer 4. The reinforcing layer 5 is bonded (glued) to the polymeric shell 7 by means of a third adhesive layer 6.

As mentioned, according to the first aspect of the invention, the third adhesive layer 6 and/or the second adhesive layer 4 are/is adapted to adhere to the meshed fibers N and, as the case may be, longitudinal fibers Na, of the reinforcing layer 5. This is optionally also the case for the pipe according to the second aspect of the invention. Additionally, the third adhesive layer and/or the second adhesive layer are/is optionally adapted to protrude between the meshed fibers so that the second adhesive layer and the third adhesive layer adhere to one another. Particularly, they form in this way a composite material, such that the meshed fibers are fixed between the second adhesive layer and the third adhesive layer. This bonding of the two adhesive layers through the meshes of the reinforcing layer is advantageous, as it provides additional fixing of the meshed fibers between the second and the third adhesive layer, i.e. the meshed fibers are encapsulated between the two adhesive layers and are not only bonded to one of the adhesive layers.

A further advantage of fixing the meshed fibers N and, as the case may be, the longitudinal fibers Na, between the fluid diffusion barrier layer and the polymeric shell is that it counteracts the so-called "creeping-out" effect. This means that the meshed fibers may under circumstances protrude out of the pipe at its ends as a consequence of slight length changes due to environmental influences, e.g. due to temperature changes. Such creeping-out is undesired as it causes problems when connecting pipe sections to one another and makes the connection process more complex and susceptible to failures.

In order to simplify the bonding between the second and the third adhesive layer, the material of the glue is preferably chosen to be the same. It is also preferred that the first adhesive layer also consists of the same material as the other two adhesive layers. Of course, in other embodiments the adhesive materials may differ. Particularly, the first adhesive layer may be chosen to be different from the second and the third adhesive layer as it only has to satisfy the requirement of reliably gluing the polymeric tube to the diffusion barrier layer. The chosen material may vary depending on the choice of the material of the diffusion barrier layer; that is if the diffusion barrier layer comprises EVOH or aluminium. In the case of using a laminate material for the diffusion barrier layer, as described above, the first adhesive layer may also vary depending on the composition of the last sublayer facing the polymeric tube, which can either be aluminium or an adhesive sublayer. With reference to the options for the second configuration of the diffusion barrier layer, the first adhesive layer may be identical to the adhesive sublayer of option 4) or to the first adhesive sublayer of options 5) and 6). This saves an application step of applying an additional first adhesive layer.

The second and the third adhesive layers may also be chosen to be different provided that they have the capability of adhering to one another.

A preferred material for the adhesive layers is polyolefin-based maleic anhydride glue, particularly co-PP-based maleic anhydride glue. Another preferred material is epoxy glue, or a polyurethane glue. Other types of glue can also be used if they provide the required bonding strength.

FIG. 2 shows a detail of the reinforcing layer of FIG. 1, illustrating the meshed fibers N and exemplarily additional longitudinal fibers Na.

Depending on the application, particularly on the target pressure to be expected on the pipe, the reinforcing layer may also be composed of multiple sublayers, where each sublayer may be composed of meshed fibers and/or additional longitudinal fibers Na. However, one layer of meshed fibers has proven to be sufficient for a broad range of target pressures, which will be explained in more detail with reference to FIG. 3.

Figure 3:
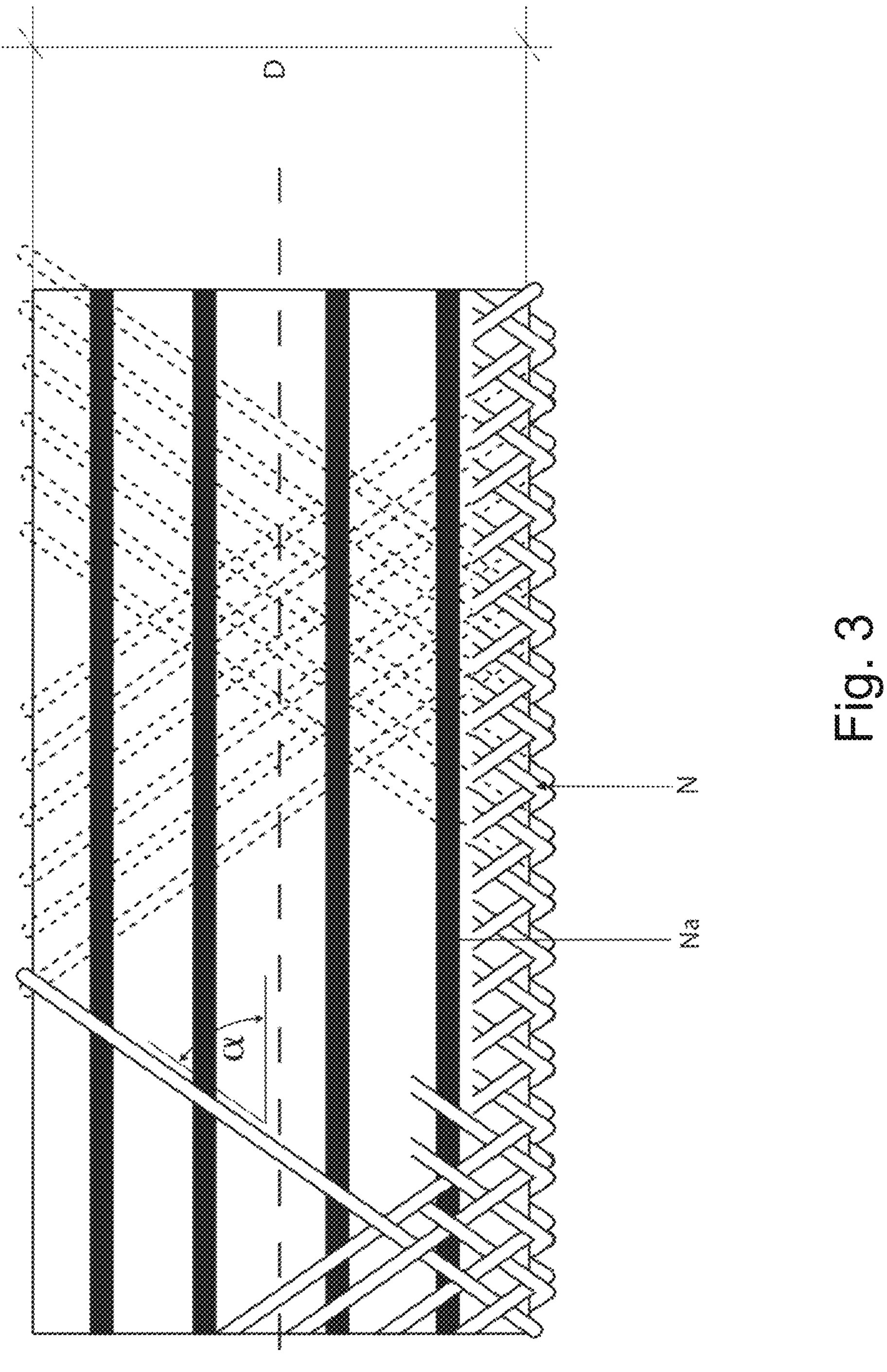
FIG. 3 shows a detailed side view of a section of the reinforcing layer.

FIG. 3 shows a detailed side view of a section of the reinforcing layer. D represents the outer diameter of the innermost polymeric tube. For simplicity reasons the fluid diffusion barrier layer 3 has not been illustrated in the figure. However, for the calculation purposes of this document, a diameter D1 of the fluid diffusion barrier could also be used, as the diameter difference is negligible. In FIG. 3, x represents the longitudinal axis of the pipe P and r represents the radial axis the pipe P. N refers to the meshed fibers and Na refers to additional longitudinal fibers, which are oriented parallel to the longitudinal axis of the pipe.

As can be seen in the figure, the meshed fibers N in each direction forming the mesh are arranged at an angle $\alpha$ with respect to the longitudinal axis in a non-parallel way to a cross-section of the pipe and in a non-parallel way to the longitudinal axis of the pipe.

In embodiments, the meshed fibers have a different DTEX-value than the longitudinal fibers. The DTEX value (deci-tex) is a value of grams per 10,000 metres of yarn and is a direct measure of linear density of the fiber. This is known to the skilled person. The advantage of using different DTEX values for the meshed fibers and the longitudinal fibers is greater flexibility in the configuration for the desired pipe parameters and optimization of material and production costs.

The angle α is calculated according to formula (I) mentioned at the beginning in the context of the second aspect of the invention. However, the subsequent discussion of this and further formulas also apply for embodiments of the first aspect of the invention. Accordingly, the same applies for the number of additional longitudinal fibers, which are calculated according to formula (II). For convenience, formula (I) is repeated here:

$$P = \frac{2N\sin^2\alpha}{\pi D^2\cos\alpha}\frac{R}{\left(1+\frac{\epsilon}{100}\right)^2} \tag{I}$$

N represents the total number of the meshed fibers, P represents a target burst pressure, R represents the maximum load per meshed fiber in Newton, D represents the outer diameter of the innermost polymeric tube, and $\epsilon$ represents a meshed fiber elongation at break.

The elongation at break is a property of the fiber and describes the ratio between changed length and initial length after breakage in percentage. The elongation at break and the maximum load depend on the fiber DTEX value.

The number of meshed fibers depends on the number of fiber carriers on the machine that lays the fibers, e.g. a braiding machine, and on the number of fibers arranged in parallel on every bobbin of the machine, which number is for example 1 to 4. Depending on the braiding machine, the number of meshed fibers can e.g. be 24, 48, 72, 96, 120, 144, 168, or 192.

With reference to the prior art mentioned at the beginning, the calculation used there for the number of meshed fibers assumes a so-called equilibrium angle of 54°44". The desired target burst pressure and the diameter D are given. Thus, the parameters N, R, ε can be adjusted in order to attain an as equal as possible resistance to radial and axial force components. Contrary to this, in the present invention, the angle α is also considered as a variable. In a first alternative, the angle α is chosen to be greater than said equilibrium angle, thereby allowing a greater flexibility of choice of the other variable parameters N, R, ε. In a second alternative, the angle α is calculated depending on said other variable parameters. In other words, one or more parameters of formula (I) are adaptable in such a way that the angle α is greater than the equilibrium angle of 54°44". Both alternatives allow a design of the pipe P in such a way that it is as balanced as possible with respect to its resistance to radial and axial force components on fibres due to the pressure for varying desired target burst pressures. It has been discovered that a better balance than the solution of the mentioned prior art, which allows an increase of resistance to the radial force component at the expense of the resistance to the axial force component and vice versa, is achieved in this way. In order to compensate for the remaining imbalance with respect to the resistance to radial and axial force components the additional longitudinal fibers are introduced. By applying the calculated or chosen angle α and parameters R, ε to formula (II), the number $N_a$ of additional longitudinal fibers required for compensating said remaining imbalance is calculated. For the sake of completeness, formula (II) results from the following formula (IV), which reflects the imbalance between the maximum axial and radial force components due to the pressure:

$$\Delta P_{fr} = \frac{2N}{\pi D^2}R'\left(\sin\alpha\ \tan\alpha - 2\left(\cos\alpha + N_a/N\right)\right) \tag{IV}$$

where $\Delta P_{fr}$ is the difference between the burst pressure calculated according to the radial force component on fibres and the burst pressure calculated according to the axial force component on fibers. Now, formula (II) results from setting $\Delta P_{fr}=0$, which shall reflect the aim to balance the maximum radial and axial force components. In case no longitudinal fibers are used, (thus $N_a=0$), the above mentioned equilibrium angle of 54°44" known from the prior art results and is mandatory in order to satisfy $\Delta P_{fr}=0$.

By using formula (IV) with $N_a=0$ and varying the angle α it is possible to find out what type of force imbalance would result, i.e. which maximum force component would be lower and thereby would determine the burst pressure applicable to the pipe.

If α>54°44", the radial force component increases and the axial force component decreases. The lower axial force can be compensated (to reach substantially $\Delta P_{fr}=0$) by introducing the number $N_a$ of longitudinal fibers calculated according to formula (II).

If α<54°44", the axial force component increases and the radial force component decreases. The lower radial force can be compensated (to reach substantially $\Delta P_{fr}=0$) e.g. by introducing a second additional sublayer of meshed fibers or by choosing stronger meshed fibers for the reinforcing layer.

Thus, the total number $N_a$ of additional longitudinal fibers is configured to equalize a reinforcement degree with respect to forces acting on the pipe in a radial direction and a longitudinal direction of the pipe P, thereby allowing a higher target burst pressure than a burst pressure at the equilibrium angle of 54°44". It is noted that the numbers N, $N_a$, $N_{a1}$, $N_{a2}$ must be integer values. Therefore, in case the formulas presented in the text don't yield an integer value, the corresponding fiber number is rounded up to the next integer value.

In embodiments, the longitudinal fibers comprise a number $N_{a1}$ of first longitudinal fibers with a first DTEX-value and a number $N_{a2}$ of second longitudinal fibers with a second DTEX-value. The first longitudinal fibers and the second longitudinal fibers are arranged alternatingly. The total number of longitudinal fibers is determined according to formula (III)

$$N_{a1}\frac{R_{a1}}{\left(1+\frac{\epsilon_{a1}}{100}\right)^2} + N_{a2}\frac{R_{a2}}{\left(1+\frac{\epsilon_{a2}}{100}\right)^2} \geq N_a\frac{R_a}{\left(1+\frac{\epsilon_a}{100}\right)^2}, \tag{III}$$

where $R_{a1}$ represents the maximum load per first longitudinal fiber in Newton, $R_{a2}$ represents the maximum load per second longitudinal fiber in Newton, $\epsilon_{\alpha 1}$ represents an elongation at break for the first longitudinal fiber and $\epsilon_{\alpha 2}$ represents an elongation at break for the second longitudinal fiber. Thus, in this case, all used fibers (meshed fibers, first longitudinal fibers, second longitudinal fibers) have different DTEX values. Such flexibility in selection of DTEX values allows for better matching of components, optimization of design and production costs.

If in embodiments of the first aspect of the invention additional fibers $N_a$ are used, which e.g. are meshed with the meshed fibers, or in case the reinforcing layer is itself composed of multiple sublayers, the invention also encompasses the bonding and thereby fixing of all fibers of the single layer or of all sublayers of the reinforcing layer, respectively, between the fluid diffusion barrier layer and the polymeric shell.

To summarize, by using formula (I) and (II) and optionally formula (III), the reinforced pipe P can be designed to be resistant to axial and radial force components on the fibers due to the pressure in a balanced way, with very little to no trade-off between radial resistance and axial resistance, thereby making the pipe stronger and more stable and durable. Additionally, the introduction of a reinforcement layer designed in the way explained above allows a substantial reduction of wall thickness of the innermost polymeric tube as compared to pipes without such a reinforcement layer. Calculation examples in this respect can be found in the tables below. It is noted that these are theoretical calculations assuming certain realistic parameters of a typical district heating application, namely transportation of heating water at the working temperature of 115° C. and pressure of 1.6 MPa. The tables aim to show the difference between using reinforced pipes according to the invention and the theoretical usage of pure PEX pipes. Currently monolithic PEX pipes are not used in such installation for the very reason that their calculated wall thicknesses (i.e. SDR=3.35) are not feasible. This example shows the advantage of the invention.

Each row of table 1 corresponds to the same row of table 2. The abbreviations in the tables are as follows:

riPEX=reinforced PEX polymeric tube 1

PEX=not reinforced PEX polymeric tube

ID=inner diameter of polymeric tube

AD=outer diameter of polymeric tube s=wall thickness $$\text{Area} = \frac{\pi}{4}\left(AD^2 - ID^2\right)$$

Area reduction=volume reduction of PEX material

E/J, C/I=refers to the ratio of the respective column value in the table

SDR="Standard Dimensional Ratio" refers to the geometry of the pipe. SDR is defined as the ratio of the nominal outside diameter to the nominal wall thickness. Therefore, a higher SDR indicates a thinner-walled pipe at any given diameter.

TABLE 1

| A<br>ID riPEX | B<br>AD riPEX | C<br>s riPex | D<br>SDR riPEX | E<br>Area riPEX |
|---|---|---|---|---|
| 32.6 | 37.6 | 2.5 | 15.0 | 275.67 |
| 40.8 | 47.0 | 3.1 | 15.2 | 427.54 |
| 51.4 | 58.6 | 3.6 | 16.3 | 622.04 |
| 61.4 | 69.2 | 3.9 | 17.7 | 800.07 |
| 73.6 | 82.6 | 4.5 | 18.4 | 1'104.11 |
| 90.0 | 100.0 | 5.0 | 20.0 | 1'492.26 |
| 102.2 | 112.8 | 5.3 | 21.3 | 1'789.92 |
| 114.6 | 125.8 | 5.6 | 22.5 | 2'114.67 |
| 130.8 | 143.4 | 6.3 | 22.8 | 2'713.49 |

TABLE 2

| F<br>SDR<br>PEX | G<br>ID Pex =<br>riPEX | H<br>AD<br>PEX | I<br>s<br>PEX | J<br>Area<br>PEX | K<br>E/J | L<br>C/I | 1-K<br>area<br>reduction | 1-L<br>s<br>reduction |
|---|---|---|---|---|---|---|---|---|
| 3.35 | 32.6 | 80.90 | 24.15 | 4'305.12 | 6.4% | 10.4% | 93.6% | 89.6% |
| 3.35 | 40.8 | 101.24 | 30.22 | 6'743.27 | 6.3% | 10.3% | 93.7% | 89.7% |
| 3.35 | 51.4 | 127.55 | 38.07 | 10'702.28 | 5.8% | 9.5% | 94.2% | 90.5% |
| 3.35 | 61.4 | 152.36 | 45.48 | 15'271.68 | 5.2% | 8.6% | 94.8% | 91.4% |
| 3.35 | 73.6 | 182.64 | 54.52 | 21'943.50 | 5.0% | 8.3% | 95.0% | 91.7% |
| 3.35 | 90.0 | 223.33 | 66.67 | 32'812.19 | 4.5% | 7.5% | 95.5% | 92.5% |
| 3.35 | 102.2 | 253.61 | 75.70 | 42'310.87 | 4.2% | 7.0% | 95.8% | 93.0% |
| 3.35 | 114.6 | 284.38 | 84.89 | 53'200.96 | 4.0% | 6.6% | 96.0% | 93.4% |
| 3.35 | 130.8 | 324.58 | 96.89 | 69'305.18 | 3.9% | 6.5% | 96.1% | 93.5% |

As can be seen from the tables the reduction in wall thickness is between 89.6% and 93.5% while the material reduction is even higher between 93.6% and 96.1%. As mentioned before, this comparison is a theoretical one aimed to illustrate the benefits of invention. PEX pipes with the SDR ratio of 3.35 are not offered due to technological limitations.

Figure 4:
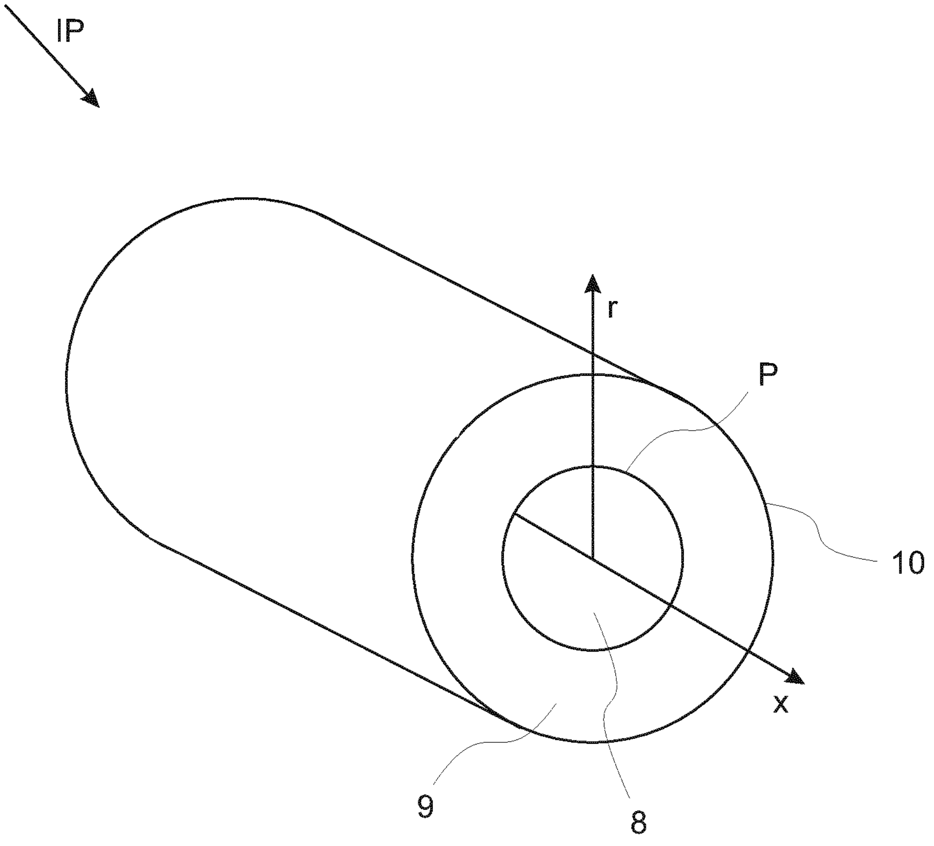
FIG. 4 shows an insulated pipe according to the third aspect of the invention.

FIG. 4 shows an insulated pipe IP according to the third aspect of the invention. The insulated pipe comprises as seen radially outward a pipe P according to the first or the second aspect of the invention, through which the medium 8, e.g. hot water, flows, a thermal insulation layer 9, which is preferably a PUR-foam layer, and an outer jacket 10, which is preferably made of a thermoplastic material. Usually, the insulated pipe IP is manufactured by first centering the pipe P inside the outer jacket 10 and introducing in the gap between the pipe and the outer jacket an insulating foam that expands and hardens, thereby filling the gap entirely. This is known to the skilled person and will not be explained in detail here. For the sake of completeness reference is made to patent EP0897788, which describes a method for manufacturing a thermally insulated pipe, and to patent EP2953776, which describes a method for producing an insulated pipe in corrugated casing.

In the following, the manufacturing process according to the fourth aspect of the invention will be described in more detail.

In a first step a), the innermost polymeric tube is extruded by using an adequate extruder, which is known.

In a second step b), the first adhesive layer 2 is applied onto the innermost polymeric tube by known methods, e.g. extruding, spraying, coating, whereby the preferred method of applying the adhesive layer is by extrusion. It is noted that each step following a step of application of an adhesive layer is carried out in due time before the adhesive hardens. This time window may vary depending of the adhesive used.

In a third step c), the fluid diffusion barrier layer 3 is applied onto the first adhesive layer. In case the diffusion barrier layer comprises a metal, step c) is preferably carried out by spirally wrapping or taping the diffusion barrier layer onto the first adhesive layer or by surrounding the first adhesive layer with the diffusion barrier layer and subsequently fusing (e.g. welding) edges of the diffusion barrier layer together. In case the fluid diffusion barrier layer is composed of multiple aluminium sublayers, all layers may e.g. be wrapped in one direction. Alternatively, sublayers can be wrapped in opposite directions, particularly alternatingly.

In case the fluid diffusion barrier layer comprises a thermoplastic material, step c) is preferably carried out by extruding the fluid diffusion barrier layer onto the first adhesive layer. As mentioned with reference to FIG. 1, if the fluid diffusion barrier layer contains multiple sublayers, it may be obtained already prefabricated or it may be manufactured in advance according to one of the described processes.

In a fourth step d), the second adhesive layer 4 is applied onto the fluid diffusion barrier layer similarly as step b).

In a fifth step e), the reinforcing layer 5 is applied onto the second adhesive layer, preferably by braiding or spiraling or warping or taping the reinforcing layer.

In one embodiment, the additional longitudinal fibers $N_a$ are incorporated in the meshed fibers. For example, they can be woven into the meshed fibers at the same time when the meshed fibers are being applied to the pipe. This advantageously accelerates the application of the reinforcing layer, as all fibers are placed in a single step.

In another embodiment, the additional longitudinal fibers are applied as an independent sublayer on or below the meshed fibers as seen radially outward. In this embodiment, the reinforcing layer is consequently formed by at least two sublayers. While two steps are required for applying a first sublayer consisting of the meshed fibers and a second sublayer consisting of the longitudinal fibers, the complexity of the machinery used for the application is advantageously lower.

In yet another embodiment, a combination of the two aforementioned embodiments can be used. In a first step, a sublayer consisting of meshed fibers and integrated longitudinal fibers can be applied first in the way mentioned above and subsequently one or more additional sublayers of either only additional longitudinal fibers or a combination of meshed fibers and longitudinal fibers can be sequentially applied.

In embodiments, it is preferred that the method step e) comprises a substep e1) of stretching and tensioning the fibers (meshed fibers and/or additional longitudinal fibers) while applying, e.g. while meshing, the fibers to yield the reinforcing layer by means of at least one spring. It is preferred to choose the spring to be different for different DTEX-values of the fibers in order to achieve good tensioning for different types of fibers. In case the reinforcing layer comprises a combination of fibers with different DTEX-values, preferably different springs are used for fibers with different DTEX-values. Advantageously, by using one or more springs by means of which the fibers are tensioned, the strength of the reinforcing layer is increased.

In a sixth step f), the third adhesive layer 6 is applied onto the reinforcing layer 5. While it is preferred to carry out steps d) to f) within such a time window that the second adhesive layer doesn't harden until the third adhesive layer has been applied, in order to achieve a better bonding between the two adhesive layers, it is also sufficient to carry out only step e) within that time window.

In a seventh step g), the outermost polymeric shell 7 pipe is extruded onto the third adhesive layer in a known way.

The present invention offers multiple solutions for strengthening the pipe for transporting a fluid by taking into account different problems contributing to deterioration of ordinary pipes. In the first aspect of the invention, the strengthening is reached by fixing the fibers to the adjacent layers and thereby on the one hand yielding a pipe with an augmented "block-structure" and on the other hand avoiding damage of layers by friction. In the second aspect of the invention, the usage of improved formulas for calculating the parameters of the reinforcing layers as well as the introduction of additional longitudinal fibers ensures that the pipe is optimally balanced in terms of radial and axial force components acting on the fibers due to the pressure on the pipe during operation.

While there are shown and described presently preferred embodiments of the invention, it is to be distinctly understood that the invention is not limited thereto but may be otherwise variously embodied and practiced within the scope of the following claims. Particularly, terms like "preferably", "particularly", "in embodiments", etc. are understood to denote optional features only.

The invention claimed is:

1. Pipe (P) for transporting a fluid (8), the pipe (P) having a longitudinal axis (x) and comprising at least the following layers:

an innermost polymeric tube (1) for transporting the fluid (8), a fluid diffusion barrier layer (3) surrounding the polymeric tube (1), wherein the fluid diffusion barrier layer (3) is bonded with the polymeric tube (1) by means of a first adhesive layer (2), a reinforcing layer (5) surrounding the fluid diffusion barrier layer (3), wherein the reinforcing layer (5) comprises meshed fibers (N) providing axial (x) and radial (r) reinforcement for the pipe (P), wherein the reinforcing layer (5) is bonded with the fluid diffusion barrier layer (3) by means of a second adhesive layer (4), an outermost polymeric shell (7) surrounding the reinforcing layer (5), wherein the polymeric shell (7) is bonded with the reinforcing layer (5) by means of a third adhesive layer (6), wherein the third adhesive layer (6) and/or the second adhesive layer (4) are/is adapted to adhere to the meshed fibers (N) of the reinforcing layer (5).

2. Pipe according to claim 1, wherein the fluid diffusion barrier layer (3) is made of a thermoplastic material, wherein the thermoplastic material is EVOH or an aliphatic polyketone, adapted to limit a diffusion of at least one of the fluids: oxygen, pentane, CO2, HFO from the outside into the innermost polymeric tube (1) and to limit a diffusion of at least water vapor from the inside of the innermost polymeric tube (1) to the outside of the fluid diffusion barrier layer (3) or wherein the fluid diffusion barrier layer (3) comprises a metal, wherein the metal is aluminium, adapted to stop a diffusion of at least one of the fluids: oxygen, pentane, CO2, HFO from the outside into the innermost polymeric tube (1) and to stop a diffusion of at least water vapor from the inside of the innermost polymeric tube (1) to the outside of the fluid diffusion barrier layer.

3. Pipe according to claim 2, wherein the fluid diffusion barrier layer (3) comprises at least one aluminium layer with a thickness greater than 0.1 mm or wherein the fluid diffusion barrier layer (3) comprises, as seen radially outward from the longitudinal axis of the pipe, at least one laminate layer comprising multiple sublayers, chosen from the following options:

- an aluminium sublayer and a polymeric sublayer;
- a first aluminium sublayer, a polymeric sublayer, a second aluminium sublayer, an adhesive sublayer;
- an aluminium sublayer, a polymeric sublayer, an adhesive sublayer;
- an adhesive sublayer, an aluminium sublayer, a polymeric sublayer;
- a first adhesive sublayer, an aluminium sublayer, a polymeric sublayer, a second adhesive sublayer, wherein the first adhesive sublayer and the second adhesive sublayer consist of the same material;
- a first adhesive sublayer, an aluminium sublayer, a polymeric sublayer, a second aluminium sublayer, a second adhesive sublayer;
- at least two aluminium sublayers;
- wherein in all options containing a polymeric sublayer the polymeric sublayer is a PET sublayer or a PE sublayer,
- wherein, in case the aluminium layer comprises more than one sublayer, a thickness of each aluminium sublayer is between 0.005 mm and 0.2 mm.

4. Pipe according to claim 1, wherein the third adhesive layer (6) and/or the second adhesive layer (4) are/is adapted to protrude between the meshed fibers (N) so that the second adhesive layer (4) and the third adhesive layer (6) adhere to one another, thereby forming a composite material, such that the meshed fibers (N) are fixed between the second adhesive layer (4) and the third adhesive layer.

5. Pipe according to claim 1, wherein the second adhesive layer (4) and the third adhesive layer (6) consist of the same material, wherein the first adhesive layer (2) and the second and the third adhesive layer (6) consist of the same material, wherein the material is polyolefin-based maleic anhydride glue, wherein the polyolefin-based maleic anhydride glue is co-PP-based maleic anhydride glue, or the material is epoxy glue, or the material is a polyurethane glue, or wherein the second adhesive layer (4) and the third adhesive layer (6) are made of different materials.

6. Pipe according to claim 1, wherein the meshed fibers (N) in each direction forming the mesh are arranged at an angle α with respect to the longitudinal axis in a non-parallel way to a cross-section of the pipe and in a non-parallel way to the longitudinal axis of the pipe, wherein the reinforcing layer (5) comprises a total number $N_a$ of additional longitudinal fibers which are oriented parallel to the longitudinal axis of the pipe, wherein the longitudinal fibers are incorporated in the meshed fibers (N) or are applied as an independent sublayer on the meshed fibers.

7. Pipe according to claim 6, wherein the angle α of the meshed fibers (N) for a given total number of meshed fibers (N) depends on a target burst pressure P on the pipe and is determined according to formula (I):

$$P = \frac{2N\sin^2\alpha}{\pi D^2\cos\alpha}\frac{R}{\left(1+\frac{\epsilon}{100}\right)^2} \tag{I}$$

where:

N represents the total number of the meshed fibers,

R represents a maximum load per meshed fiber in Newton,

D represents the outer diameter of the innermost polymeric tube, and

ϵ represents a meshed fiber elongation at break.

8. Pipe according to claim 7, wherein the total number $N_a$ of additional longitudinal fibers for the angle α calculated according to formula (I) is determined according to formula (II):

$$N_a \geq (0.5\,N\sin\,\propto\tan\alpha - N\cos\alpha)\frac{\frac{R}{\left(1+\frac{\epsilon}{100}\right)^2}}{\frac{R_a}{\left(1+\frac{\epsilon_a}{100}\right)^2}} \tag{II}$$

where:

N represents the total number of the meshed fibers,

R represents the maximum load per meshed fiber in Newton, $R_a$ represents the maximum load per longitudinal fiber in Newton, ϵ represents a meshed fiber elongation at break, and $\epsilon_\alpha$ represents a longitudinal fiber elongation at break, wherein the longitudinal fibers comprise a number $N_{a1}$ of first longitudinal fibers with a first DTEX-value and a number $N_{a2}$ of second longitudinal fibers with a second DTEX-value, wherein the first longitudinal fibers and the second longitudinal fibers are arranged alternatingly, wherein the total number of longitudinal fibers is determined according to formula (III)

$$N_{a1}\frac{R_{a1}}{\left(1+\frac{\epsilon_{a1}}{100}\right)^2} + N_{a2}\frac{R_{a2}}{\left(1+\frac{\epsilon_{a2}}{100}\right)^2} \geq N_a\frac{R_a}{\left(1+\frac{\epsilon_a}{100}\right)^2}, \tag{III}$$

where $R_{a1}$ represents the maximum load per first longitudinal fiber in Newton, $R_{a2}$ represents the maximum load per second longitudinal fiber in Newton, $\epsilon_{\alpha1}$ represents an elongation at break for the first longitudinal fiber, and $\epsilon_{\alpha2}$ represents an elongation at break for the second longitudinal fiber.

9. Pipe according to claim 1, wherein the meshed fibers (N) in each direction forming the mesh are arranged at an angle α relative to the longitudinal axis of the pipe non-parallel to a cross-section of the pipe and non-parallel to a longitudinal axis of the pipe, wherein the angle α is determined according to formula (I):

$$P = \frac{2N\sin^2\alpha}{\pi D^2\cos\alpha}\frac{R}{\left(1+\frac{\epsilon}{100}\right)^2} \tag{I}$$

where:

N represents the total number of the meshed fibers,

P represents a target burst pressure,

R represents the maximum load per meshed fiber in Newton,

D represents the outer diameter of the innermost polymeric tube, and $\epsilon$ represents a meshed fiber elongation at break, wherein the reinforcing layer (5) comprises a number $N_a$ of additional longitudinal fibers which are oriented parallel to the longitudinal axis of the pipe, wherein the number $N_a$ of longitudinal fibers is calculated by the formula (II):

$$N_a \geq (0.5\, N \sin \propto \tan\alpha - N \cos\alpha) \frac{\frac{R}{\left(1+\frac{\epsilon}{100}\right)^2}}{\frac{R_a}{\left(1+\frac{\epsilon_a}{100}\right)^2}} \tag{II}$$

where $R_a$ represents the maximum load per longitudinal fiber in Newton, and $\epsilon_\alpha$ represents a longitudinal fiber elongation at break.

10. Pipe according to claim 9, wherein the longitudinal fibers comprise a number $N_{a1}$ of first longitudinal fibers with a first DTEX-value and a number $N_{a2}$ of second longitudinal fibers with a second DTEX-value, wherein the first longitudinal fibers and the second longitudinal fibers are arranged alternatingly, wherein the total number of longitudinal fibers is determined according to formula (III)

$$N_{a1} \frac{R_{a1}}{\left(1+\frac{\epsilon_{a1}}{100}\right)^2} + N_{a2} \frac{R_{a2}}{\left(1+\frac{\epsilon_{a2}}{100}\right)^2} \geq N_a \frac{R_a}{\left(1+\frac{\epsilon_a}{100}\right)^2}, \tag{III}$$

where $R_{a1}$ represents the maximum load per first longitudinal fiber in Newton, $R_{a2}$ represents the maximum load per second longitudinal fiber in Newton, $\epsilon_{\alpha 1}$ represents an elongation at break for the first longitudinal fiber, and $\epsilon_{\alpha 2}$ represents an elongation at break for the second longitudinal fiber.

11. Pipe according to claim 9, wherein the fluid diffusion barrier layer (3) is made of a thermoplastic material, wherein the thermoplastic material is EVOH or an aliphatic polyketone, adapted to limit a diffusion of at least one of the fluids: oxygen, pentane, CO2, HFO from the outside into the innermost polymeric tube (1) and to limit a diffusion of at least water vapor from the inside of the innermost polymeric tube (1) to the outside of the fluid diffusion barrier layer (3) or wherein the fluid diffusion barrier layer (3) comprises a metal, wherein the metal is aluminium, adapted to stop a diffusion of at least one of the fluids:

oxygen, pentane, CO2, HFO from the outside into the innermost polymeric tube (1) and to stop a diffusion of at least water vapor from the inside of the innermost polymeric tube (1) to the outside of the fluid diffusion barrier layer.

12. Pipe according to claim 11, wherein the fluid diffusion barrier layer (3) comprises at least one aluminium layer with a thickness greater than 0.1 mm or wherein the aluminium layer comprises, as seen radially outward from the longitudinal axis of the pipe, at least one laminate layer comprising multiple sublayers, chosen from one of the following options:

an aluminium sublayer and a polymeric sublayer;

a first aluminium sublayer, a polymeric sublayer, a second aluminium sublayer, an adhesive sublayer;

an aluminium sublayer, a polymeric sublayer, an adhesive sublayer;

an adhesive sublayer, an aluminium sublayer, a polymeric sublayer;

a first adhesive sublayer, an aluminium sublayer, a polymeric sublayer, a second adhesive sublayer, wherein the first adhesive sublayer and the second adhesive sublayer consist of the same material;

a first adhesive sublayer, an aluminium sublayer, a polymeric sublayer, a second aluminium sublayer, a second adhesive sublayer;

at least two aluminium sublayers;

wherein in all options the polymeric sublayer is a PET sublayer, wherein, in case the aluminium layer comprises more than one sublayer, a thickness of each aluminium sublayer is between 0.005 mm and 0.2 mm.

13. Pipe according to claim 9, wherein the third adhesive layer (6) and/or the second adhesive layer (4) are/is adapted to adhere to the meshed fibers (N) of the reinforcing layer (5), wherein the third adhesive layer (6) and/or the second adhesive layer (4) are/is adapted to protrude between the meshed fibers (N) so that the second adhesive layer (4) and the third adhesive layer (6) adhere to one another, thereby forming a composite material, such that the meshed fibers (N) are fixed between the second adhesive layer (4) and the third adhesive layer (6).

14. Pipe according to claim 9, wherein the second adhesive layer (4) and the third adhesive layer (6) consist of the same material, wherein the first adhesive layer (2) and the second and the third adhesive layer (6) consist of the same material, wherein the material is polyolefin-based maleic anhydride glue, wherein the polyolefin-based maleic anhydride glue is co-PP-based maleic anhydride glue, or the material is epoxy glue, or the material is a polyurethane glue, or wherein the second adhesive layer (4) and the third adhesive layer (6) are made of different materials.

15. Insulated pipe for transporting a fluid, wherein the fluid is heated water for district heating, comprising a pipe according to claim 9, a thermal insulation layer, wherein the thermal insulation layer is a PUR-foam layer, surrounding the outermost polymeric shell (7) of said pipe, and an outer jacket made of a thermoplastic material, surrounding the thermal insulation layer.

* * * * *